(No Model.)
W. PETERSON.
CALCIMINING MACHINE.
No. 489,828. Patented Jan. 10, 1893.
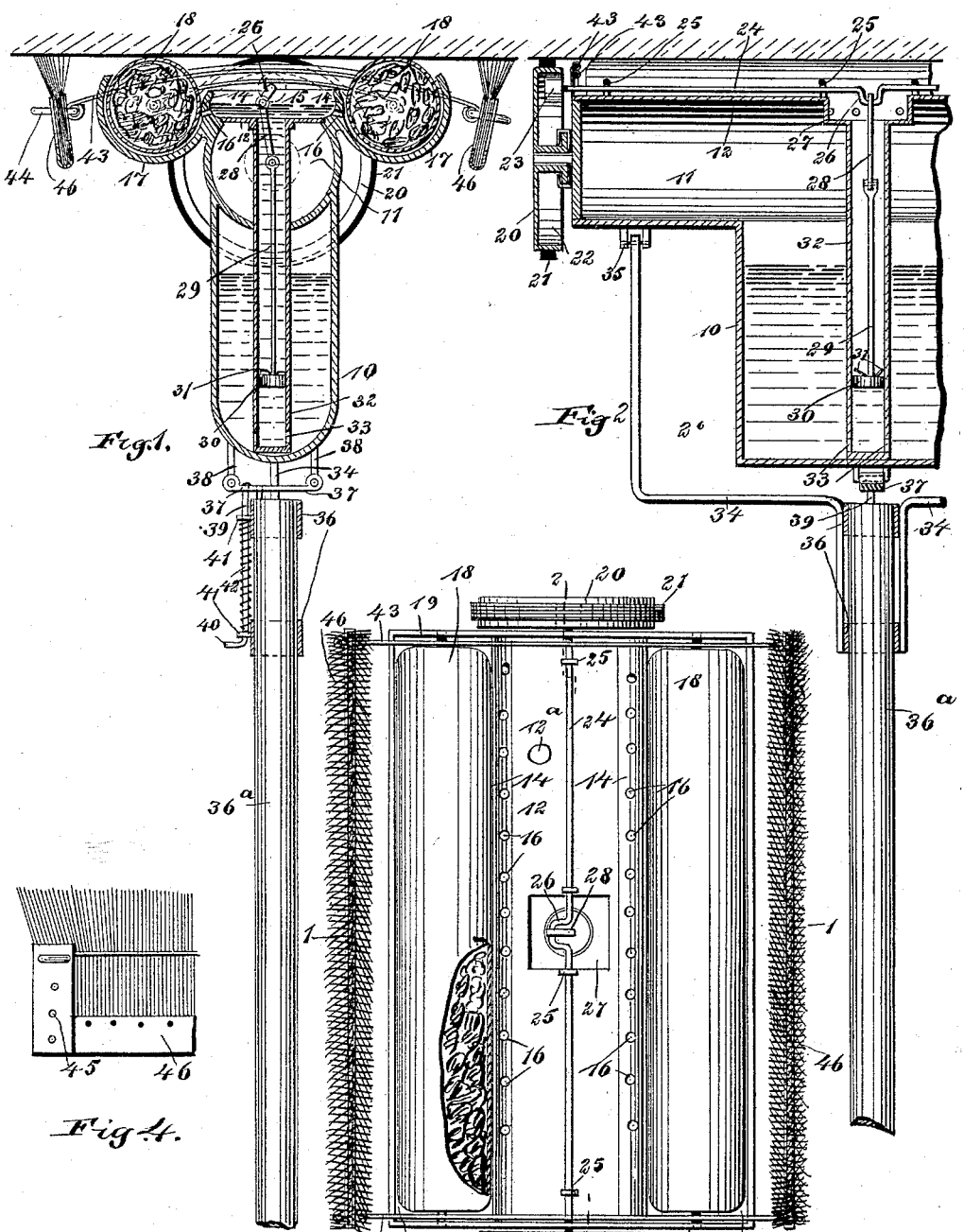
WITNESSES:
F. McArdle
C. Sedgwick
INVENTOR
W. Peterson
BY Munn & Co
ATTORNEYS.

UNITED STATES PATENT OFFICE.

WILLIAM PETERSON, OF SHEBOYGAN, WISCONSIN.

CALCIMINING-MACHINE.

SPECIFICATION forming part of Letters Patent No. 489,828, dated January 10, 1893.

Application filed June 7, 1892. Serial No. 435,828. (No model.)

*To all whom it may concern:*

Be it known that I, WILLIAM PETERSON, of Sheboygan, in the county of Sheboygan and State of Wisconsin, have invented a new and Improved Calcimining-Machine, of which the following is a full, clear, and exact description.

My invention relates to improvements in calcimining machines; and the object of my invention is to produce a simple machine which will carry a large amount of calcimine, whitewash, or other liquid, and which may be pushed over a ceiling or wall so as to apply the calcimine or other liquid as nicely as it can be done by hand and a great deal more rapidly.

A further object of the invention is to construct the machine so that it will apply the calcimine or other liquid very smoothly, and in such a way that none of the liquid will be spilled.

To this end my invention consists in certain features of construction and combinations of the same, as will be fully described hereinafter and then pointed out in the claims.

Reference is to be had to the accompanying drawings forming a part of this specification, in which similar figures of reference indicate corresponding parts in all the views.

Figure 1 is a vertical cross section of the machine on the line 1—1 in Fig. 3; Fig. 2 is a broken longitudinal section on the line 2—2 in Fig. 3; Fig. 3 is a broken plan view of the machine; and Fig. 4 is a broken detail view of one of the brushes.

The machine is provided with a tank 10, which carries the calcimining liquid, and which merges at its top in a nearly cylindrical chamber 11, which has a top plate 12, with a hole 12ª therein through which the chamber and tank may be filled. Above and on opposite sides of the plate 12 are upwardly-curved walls 14, which form a receptacle 15 between them, and the walls 14 are pierced transversely by numerous perforations 16, which permit the liquid to flow through into the curved or concaved guards 17, in which the distributing rollers 18 are held to turn, these rollers extending through the entire length of the guards, and having their ends journaled in the end pieces 19 of the machine frame.

The rollers 18 are made of some spongy, yielding material, and are preferably covered with fabric of a porous nature, but instead of having the yielding substance composing the body of the rollers, they may be journaled in spring bearings if desired. The object of the yielding rollers, aside from the fact of the soft material assisting in distributing the liquid, is that the rollers may be pressed so as to permit the main wheels to come in contact with the ceiling, and operate the liquid supplying pump as hereinafter described.

Near the center of the machine and near the ends are journaled wheels 20, which are provided with rubber tires 21, and these tires assist in preventing the liquid from flowing out endwise and running onto the adjacent paper or painted ceiling. The wheels 20 have bearing flanges 22, as shown in Fig. 2, thus forming an interior recess in the wheels, in which is held a roller 23, which presses against the flange 22 and is driven by means of the frictional contact therewith, but it will be understood that the flange 22 and roller 23 may be toothed if necessary.

The rollers 23 are secured to the ends of a crank shaft 24, which extends longitudinally through the receptable 15, and is held to turn in keepers 25, the shaft having near the center a crank 26, which is held to turn in a recess or basin 27, formed in the center of the top plate 12. The crank 26 connects by means of a pitman 28, with a piston rod 29, which carries a plunger 30 like the ordinary pump plunger, this plunger having the usual valves 31, which permit the liquid to flow up through the plunger, but prevent its return. The plunger is held to move in a pump barrel 32, which extends from the basin or recess 27 downward to the bottom of the tank, and in the lower portion of the pump barrel are holes 33, which permit the liquid to flow from the tank into the barrel. It will thus be seen that the revolution of the crank shaft 24 will reciprocate the plunger 30, and cause the liquid to be pumped from the tank into the receptacle 15, from which it will flow to the distributing rollers 18.

The machine is provided with half bails 34 of angular shape, the upper ends of which are pivoted between lugs 35 on the bottom of the chamber 11, as shown in Fig. 2, and the lower ends of the bails are fixed to sleeves 36, which are secured to a depending handle 36ª. A perforated cross plate 37 extends across the upper end of the handle 36ª, and is suspended from the tank by means of hangers 38, the cross plate having holes 37ª to engage a slide bolt 39, which is bent at one end, as shown at 40, to form a handle, and which is held to slide in keepers 41 on the sleeves 36, the bolt being pressed normally by a spring 42 into engagement with the plate 37. By this mechanism just described the angle of the handle in relation to the machine may be fixed so that the machine may be worked to the best advantage.

Extending transversely across the top of the machine, at each end, are spring rods 43, which are secured to the machine top and the outer ends of which are attached to links 44, which extend through perforations 45 in brushes 46, there being a brush on both sides of the machine, and by inserting the links 44 in the right holes 45, the brushes 46 may be brought into the correct position so as to bear properly upon the ceiling.

The operation of the machine is as follows: The tank being filled with liquid, the machine is raised against the ceiling and pushed back and forth. The rollers 18 are placed a little higher than the wheels 20, so that normally the wheels will not touch and the pump will not be operated; but by pressing the machine firmly against the wall, the rollers 18 will yield, thus permitting the wheels 20 to come into contact with the ceiling and be turned, and the movement of the wheels actuates the crank rod 24 and operates the pump so that liquid is supplied to the distributing rollers, and by them and the brushes applied to the ceiling.

It will be understood that if the wheels bore at all times upon the ceiling, the pump would supply too much liquid, but by having the rollers a little higher than the wheels the liquid may be supplied as needed, and a nice job of calcimining may be quickly done.

Having thus described my invention, I claim as new, and desire to secure by Letters Patent,—

1. A calcimining machine, comprising a tank having a handle attached thereto, wheels journaled at the ends of the tank and adapted to run upon the ceiling, yielding distributing rollers held on opposite sides of the tank and a little higher than the wheels, brushes held adjacent to the rollers, and an operative connection between the pump mechanism and the rollers whereby the rotation of the latter will drive the pump, substantially as described.

2. A calcimining machine, comprising a tank having bearing wheels at its opposite ends, a receptacle arranged above the tank, a pump arranged to deliver liquid from the tank to the receptacle, an operative driving connection between the wheels and the pump, guards arranged on opposite sides of the receptacle and connected therewith, distributing rollers held to turn in the guards, brushes secured to the machine parallel with the rollers, and a handle for the machine, substantially as described.

3. A calcimining machine, comprising a tank having a handle adjustably secured to its lower end, a receptacle held above the tank, a pump connecting the tank with the receptacle, a crank shaft journaled in the upper portion of the machine and adapted to operate the pump, bearing wheels journaled on opposite ends of the machine and operatively connected with the crank shaft, guards arranged on opposite sides of the receptacle and connected therewith, distributing rollers held to turn in the upper portions of the guards, and brushes held at the outer sides of the rollers, substantially as described.

WILLIAM PETERSON.

Witnesses:
ANTON J. MALLMANN,
W. D. VAN ALLEN.